(12) United States Patent
Guzeldere

(10) Patent No.: US 10,976,136 B2
(45) Date of Patent: Apr. 13, 2021

(54) WIRELESS VISION EQUIPMENT FOR WEAPONS

(71) Applicant: Mehmet Ali Guzeldere, Antalya (TR)

(72) Inventor: Mehmet Ali Guzeldere, Antalya (TR)

( * ) Notice: Subject to any disclaimer, the term of this patent is extended or adjusted under 35 U.S.C. 154(b) by 0 days.

(21) Appl. No.: 16/479,946

(22) PCT Filed: May 3, 2018

(86) PCT No.: PCT/TR2018/050207
§ 371 (c)(1),
(2) Date: Jul. 23, 2019

(87) PCT Pub. No.: WO2019/050495
PCT Pub. Date: Mar. 14, 2019

(65) Prior Publication Data
US 2019/0376767 A1  Dec. 12, 2019

(30) Foreign Application Priority Data

Sep. 6, 2017  (TR) .................................. 2017/13066

(51) Int. Cl.
*H04N 5/225* (2006.01)
*F41G 3/14* (2006.01)
(Continued)

(52) U.S. Cl.
CPC ............... *F41G 3/165* (2013.01); *F41G 1/38* (2013.01); *G02B 23/04* (2013.01);
(Continued)

(58) Field of Classification Search
CPC .. F41G 3/165; F41G 1/38; H04N 5/38; H04N 5/2253; G02B 27/0172; G02B 23/04; G02B 2027/0178; G02B 27/017; H04W 80/00
(Continued)

(56) References Cited

U.S. PATENT DOCUMENTS 4,884,137 A * 11/1989 Hanson ................... F41G 3/165
                                                                348/158
5,711,104 A   1/1998 Schmitz
(Continued)

FOREIGN PATENT DOCUMENTS

WO    0246822 A1   6/2002

OTHER PUBLICATIONS

Horsey, Julian, Arduino Glasses Provide A Heads-Up Display For Bluetooth Multimeter, Sep. 30, 2016, Geeky Gadgets, https://www.geeky-gadgets.com/arduino-glasses-provide-a-heads-up-display-for-bluetooth-multimeter-30-09-2016/ (Year: 2016).*

(Continued)

*Primary Examiner* — Susan E. Hodges
(74) *Attorney, Agent, or Firm* — Bayramoglu Law Offices LLC

(57) ABSTRACT

A wireless vision equipment for weapons including an image capturing device configured to be mounted on a weapon using standard weapon attachment systems, a camera slot, an integrated transmitter using at least one wireless communication protocol, a beam splitter mirror aligned with an aim line, wherein the splitter mirror multiplies an incoming image by two conjugate images, a camera, a transmitter using the at least one wireless communication protocols, a receiver, an antenna, a cable, a shooting glass and a viewing device configured to be lifted upwards to avoid limiting a user's field of vision.

2 Claims, 4 Drawing Sheets

(51) Int. Cl.
  *F41G 1/38* (2006.01)
  *G02B 23/04* (2006.01)
  *G02B 27/01* (2006.01)
  *F41G 3/16* (2006.01)
  *H04N 5/38* (2006.01)
  *H04W 80/00* (2009.01)

(52) U.S. Cl.
  CPC ....... *G02B 27/0172* (2013.01); *H04N 5/2253* (2013.01); *H04N 5/38* (2013.01); *G02B 2027/0178* (2013.01); *H04W 80/00* (2013.01)

(58) Field of Classification Search
  USPC .......................................................... 348/158
  See application file for complete search history.

(56) References Cited

U.S. PATENT DOCUMENTS

| 8,336,777 | B1* | 12/2012 | Pantuso | F41G 3/16 235/409 |
| 8,817,103 | B2* | 8/2014 | Scales | A63F 13/10 348/158 |
| 9,021,934 | B1 | 5/2015 | Hagerty | |
| 9,229,230 | B2* | 1/2016 | Scales | G02B 27/017 |
| 10,619,976 | B2* | 4/2020 | Peel | F41G 3/08 |
| 2008/0005702 | A1* | 1/2008 | Skourup | G06F 3/011 715/848 |
| 2009/0040308 | A1* | 2/2009 | Temovskiy | G02B 27/0068 348/158 |
| 2009/0174946 | A1* | 7/2009 | Raviv | G02B 27/0176 359/632 |
| 2011/0030545 | A1* | 2/2011 | Klein | F41G 3/165 89/41.05 |
| 2012/0097741 | A1* | 4/2012 | Karcher | F41G 3/142 235/404 |
| 2012/0212499 | A1* | 8/2012 | Haddick | G06F 3/017 345/589 |
| 2012/0327247 | A1* | 12/2012 | Mironichev | F41G 3/165 348/164 |

OTHER PUBLICATIONS http://en.azeridefence.com/aselsan-mini-tws-thermal-weapon-sight/ , Azeri Defence, Dec. 13, 2015.

* cited by examiner

WIRELESS VISION EQUIPMENT FOR WEAPONS

CROSS REFERENCE TO THE RELATED APPLICATIONS

This application is the national phase entry of International Application No. PCT/TR2018/050207, filed on May 3, 2018, which claims priority from Turkish Patent Application 2017/13066, filed on Sep. 6, 2017, the entire contents of which are incorporated herein by reference.

TECHNICAL FIELD

The invention relates to a vision equipment which can be mounted on any kind of weapon and transfers the image instantly captured by the user using wireless transmission protocols to any image monitoring device worn/used by the user.

BACKGROUND

Target shooting, paintball, air shooting guns and hunting-type sports create different types of hobbies for humans. The ability to get a target image where the user can focus on the target without using his or her eyes will add more excitement to these sports. By making it possible to focus on the targets without lifting guns to the eye level, it will be possible to raise the shooting rate and to save the time spent for the aiming.

It is obvious that the ability to focus on a target wirelessly will also be of interest to military forces and law enforcement officials. For example, many factors that make it difficult to target, such as the difficulty of targeting for people who use numbered goggles, will no longer be a problem thanks to the wireless transmission of a target image to any image monitoring device worn/used. Moreover, the use of weapons can be improved by being used together with a night vision system. Since the view image of the camera will be continuously transferred to the user, the user will be able to shoot the target only by seeing the target in the image without the need for the conventional shooting position. In order to improve the shooting experience, shooting with the equipment and images taken can be recorded.

Patent applications of systems similar to those described in our invention have been made. For example, in patent document numbered U.S. Pat. No. 5,711,104, the transmission of the received images to a user-worn imaging system is described with a cable. However, this system is wired and has a structure that forces the user to be close to the gun. Thus, a system is described that restricts the user and cannot provide real-time image to the user due to the usage of a wired transmission protocol.

It is desirable to be able to target by gun users without having to set eye contact with the weapon, to display and record the target by the supervisor of the user, and also to be able to take images in dark environments.

SUMMARY

The invention relates to an imaging system, which allows the user to view the images taken with a capturing device placed on the weapon and also records these taken images.

The imaging device included in the imaging system of the present invention comprises a binoculars for magnifying and a beam splitter placed in the binoculars or a mirror for reflecting the captured image in a viewable angle to a video camera. By comprising a main lens, the light beams taken by the image taking device and forming the image are divided by the collection section into two equivalent images. The first image is allowed to pass through the collection section directly so that it can be seen from the binoculars. The second image is transmitted to the camera via the secondary lens located in the collection section and then forwarded to the wireless data transfer protocol. This transmitted image is sent to the image monitoring device worn by the user.

The image capturing system used in the present invention comprises a camera placed in its slot in which a collection and distribution section is included. The distribution section is connected to an RF (Radio Frequency) transmitter which can transmit images to an RF receiver on the image monitoring device that the user wears. The image capturing device is integrated directly into the binoculars, and the aiming line of these two parts are aligned. In other words, the aim taken with the binoculars shows the field of view that the image capturing device will record. The distribution section contains a built-in transmitter. Images are transmitted to this transmitter directly or via a cabling method. The images received by this transmitter are transmitted to the user or a preferred image receiver. These images, if desired, may be recorded by the user or other viewers using an imaging device.

EQUIVALENTS OF NUMBERS GIVEN IN FIGURES

10—Image Capturing Device
12—Camera Slot
14—Integrated Transmitter
16—Binoculars
18—Beam Splitter Mirror
20—Rifle Binoculars
24—Camera
26—Transmitter
30—Gun
32—Receiver
34—Antenna
36—Cable
42—Shooting Glass
44—Viewing Device

DETAILED DESCRIPTION OF THE EMBODIMENTS

Figure 1:
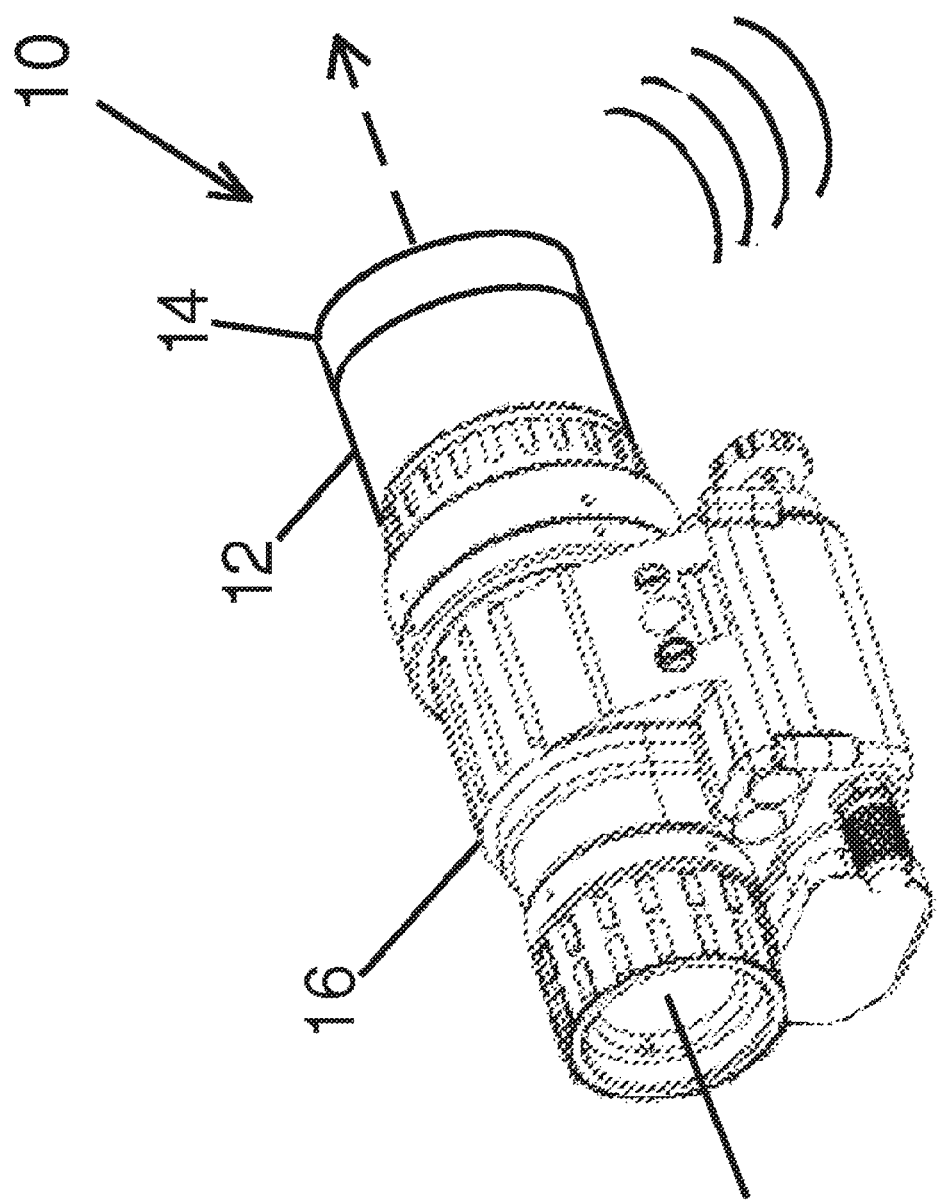
FIG. 1 shows an Unmounted View of the Image Capturing Device.

In FIG. 1, an illustrative drawing of a wireless image capturing device (10) is provided. It can be seen that a camera slot (12) is connected to an integrated transmitter (14) and a single binoculars (16) directly to the camera slot (12). The transmitter (14) uses at least one of the wireless communication protocols. The image capturing device (10) includes an integrated scope and images captured by a camera (24) can be digitally zoomed without the need for a scope if desired, so that the function expected from the scope can be fulfilled. However, it can be supported by an external binoculars even if it is not specified in the figures. The image capturing device (10) can be mounted on a gun (30) and can be mounted on any kind of weapon that uses standard weapon attachment systems and bows used in archery sports.

Figure 2:
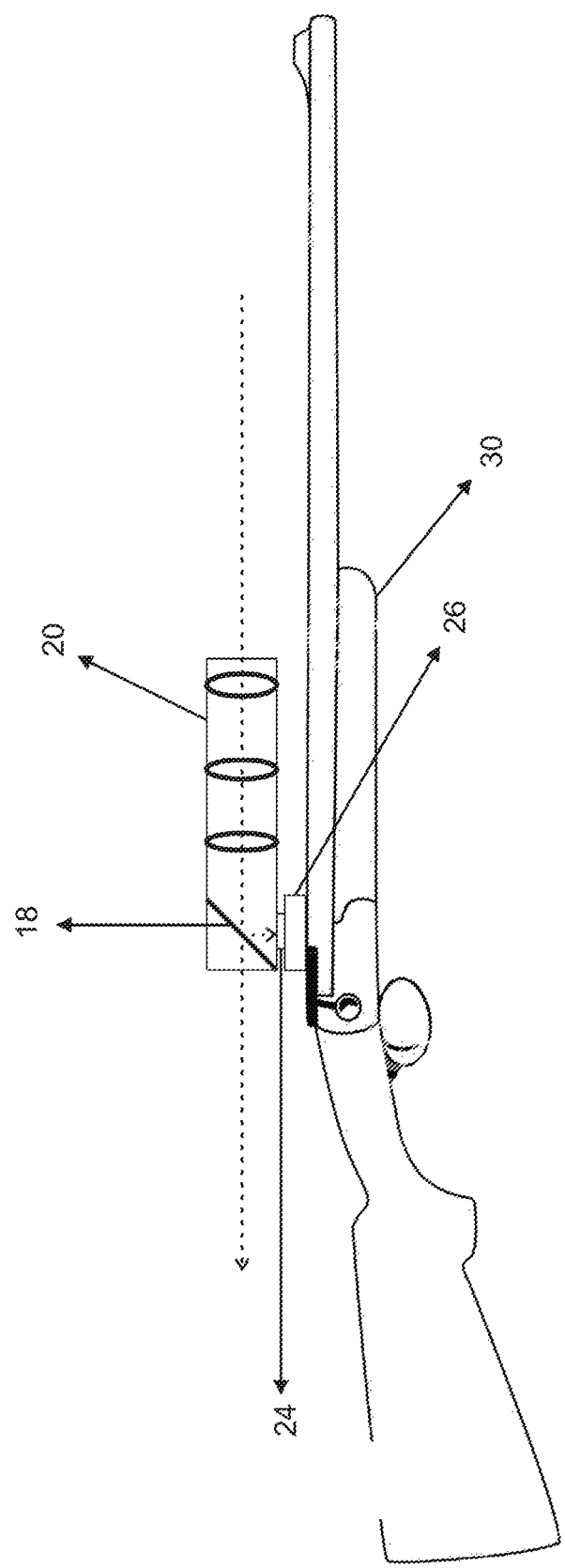
FIG. 2 shows a Mounted View of the Image Capturing Device.

In FIG. 2, the image capturing device (10) of the invention is mounted on a rifle binoculars (20) on a hunting rifle. As indicated on the image capturing device (10) shown in FIG. 2, a beam splitter mirror (18) is aligned with the aim line. The beam splitter mirror (18) multiplies the incoming image by two conjugate images. In this embodiment, one of the images is transmitted to the camera (24). At the same time, the other conjugate image is transmitted to the transmitter (26), which is ready to be used on equipment without the transmitter and uses at least one of the wireless communication protocols. The transmitted image is captured by a receiver (32). The transmitted image is captured by an antenna (34) of the receiver (32) and transmitted to a viewing device (44) worn by the user via a cable (36). Although the receiver (32) and the viewing device (44) are shown separately in the figures, these two hardware can also be integrated.

Figure 3:
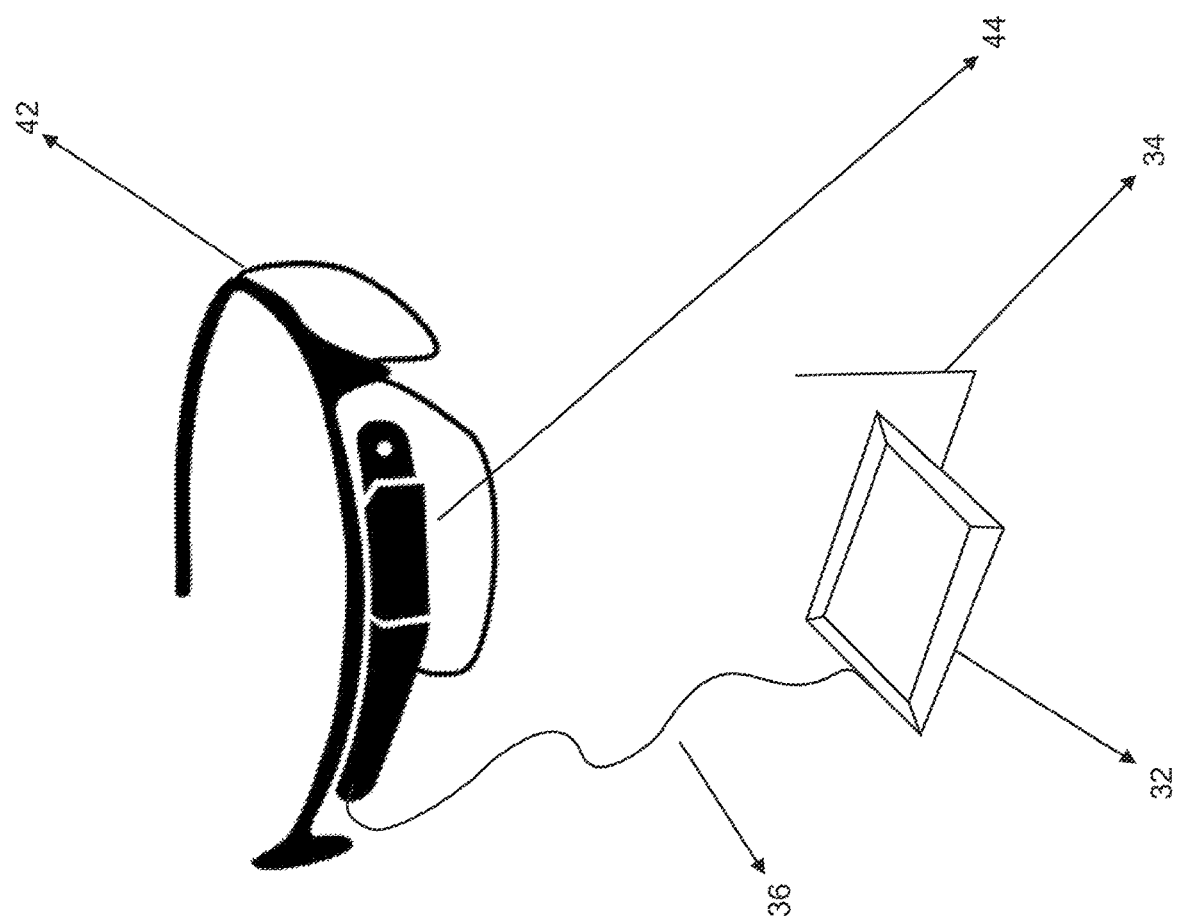
FIG. 3 shows The Image Viewing Device which is going to be used the User.
Figure 4:
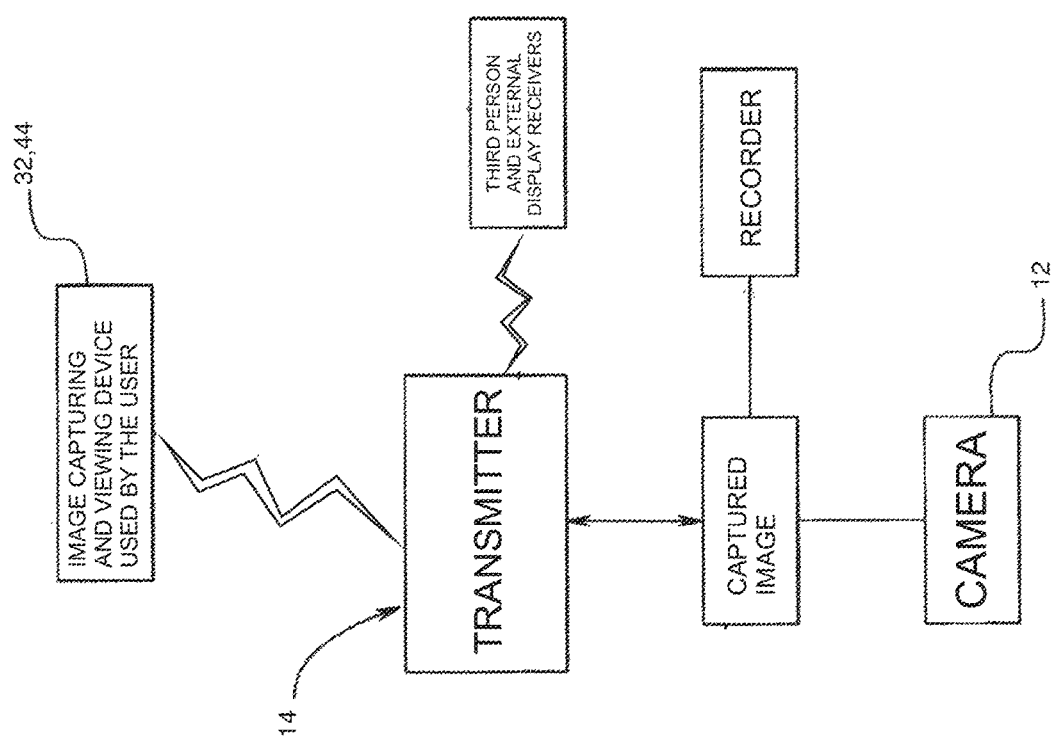
FIG. 4 shows a Flow Chart of the Image Transmission.

The imaging device (44) shown on FIG. 3 and to be used by the user is placed on a shooting glass (42). The viewing device (44) can be lifted upwards to avoid limiting the user's field of vision when needed. If desired, it is also possible to display with the glasses equipped with an integrated screen which is possible in today's technology. These images may also be recorded by the user or other viewers using the display device, if desired. With this recording function, the performance and shooting quality of the shooter can be determined.

The binoculars used on in our invention are described as an apparatus that is used in weapons and can be mounted on a weapon. However, the image transmission in our invention can be used with any image zooming device. Because of the presence of a receiver on our invention, the information feed (temperature, map, wind information, topographical features, etc.) from any device using at least one of the wireless data transmission methods can be made to the viewing device (44) used by the user.

What is claimed is:

1. A wireless vision equipment for weapons comprising: an image capturing device configured to be mounted on a weapon using standard weapon attachment systems, a camera slot, an integrated transmitter using at least one of wireless communication protocols, a beam splitter mirror aligned with an aim line, wherein the beam splitter mirror multiplies an incoming image to form two conjugate images each equivalent to the other, a camera positioned in the camera slot that captures one of the two conjugate images digitally, a receiver, an antenna, a cable, and glasses that have a shooting glass and a viewing device worn by a user, the viewing device is shaped so that a portion extends along a temple of the user and configured so that the receiver is integrated in the portion of the viewing device that extends along the temple of the user, and a screen is integrated in the glasses, wherein a first conjugate image of the two conjugate images is allowed to pass through a collection section of the image capturing device, while a second conjugate image of the two conjugate images is transmitted to the camera and then forwarded to the at least one wireless communication protocols to the screen in the glasses worn by the user; and the receiver, using at least one of the wireless communication protocols, allows data relating to temperature, map, wind and topographical features of a geographic location to be transmitted to the viewing device used by the user.

2. The wireless vision equipment of claim 1, wherein the camera is configured to perform image zooming.

* * * * *